United States Patent Office 3,344,096
Patented Sept. 26, 1967

3,344,096
FAST CURING FLUIDIZED BED COATING COMPOSITION
Joseph P. Manasia, Union, and Roy A. Allen, Iselin, N.J., assignors to Shell Oil Company, New York, N.Y., a corporation of Delaware
No Drawing. Filed Dec. 23, 1963, Ser. No. 332,943
7 Claims. (Cl. 260—18)

This invention relates to a fast curing thermosetting resin coating composition. More particularly, this invention relates to a polyepoxide resin composition which is especially suitable for application in fluidized bed processes and molding compositions.

Specifically, the invention provides a fluidizable polyepoxide coating composition which comprises a poly epoxide having a vic-epoxy equivalency greater than 1.0, a benzophenone tetracarboxylic dianhydride, and a stannous salt of a monocarboxylic acid containing at least 5 carbon atoms and preferably a fatty acid having from 5 to 20 carbon atoms.

There is a constant need to develop thermosetting resin coatings which cure relatively fast, i.e., less than a few minutes while exhibiting the necessary degree of hardness, solvent resistance and flexibility. Many thermosetting resin compositions are today employed; however, they lack to a greater or lesser extent one or more of these desirable properties. A relatively good resin composition having a relatively fast cure is a composition comprising an epoxy resin and a polyfunctional hardener hydrazide such as isophthalyl dihydrazide. Examples of such heat-curable compositions are described in U.S. 2,847,395, issued Aug. 12, 1958. While such compositions possess rapid curing properties, they do not possess the necessary flexibility demanded by some applications.

It was discovered that metallic salts of fatty acids impart fast cures to polyepoxide resin compositions; however, such metallic salts, in general, do not produce suitable or desirable impact strength, solvent resistance and/or flexibiilty. In other words, while such metallic salts provide relatively fast cure times, the polyepoxide resins so catalyzed, like the hydrazide cured polyepoxides, suffer from one or more shortcomings. Stannous salts, on the other hand, not only produce very fast cures but also impart outstandingly improved flexibility, improved impact strength and improved solvent resistance.

It was therefore quite unexpectedly discovered that rapid-curing thermosetting epoxy compositions having a greater flexibility and solvent resistance while curing very rapidly, say, in less than 60 seconds, are obtained when a stannous salt of a monocarboxylic acid, particularly a fatty acid having from about 5 to about 20 carbon atoms and more particularly from about 6 to 12 carbon atoms in the molecule is used in combination with certain benzophenone tetracarboxylic dianhydrides and polyepoxides having a vic-epoxy equivalency greater than 1.0.

It is therefore the primary object of the present invention to provide a rapid-curing, flexible, chemical resistant polyepoxide coating composition which is particularly suitable for use in fluidized bed processes. This and other objects will become apparent to one skilled in the art from the following detailed disclosure.

The objects of the present invention may be accomplished by the instant compositions which comprise a polyepoxide having a vic-epoxy equivalency greater than 1.0, a benzophenone tetracarboxylic dianhydride and a stannous salt of a monocarboxylic acid, particularly a fatty acid having from about 5 to about 20 carbon atoms in the molecule.

In the absence of stannous salts the speed of cure is measured in minutes rather than seconds. Further, unexpectedly outstanding flexibility and solvent resistance are obtained when such stannous salts are employed. Particularly rapid cures and particularly flexible coatings are obtained when stannous octoate is employed.

The benzophenone tetracarboxylic dianhydrides which may be employed in the present invention have the following structural formula:

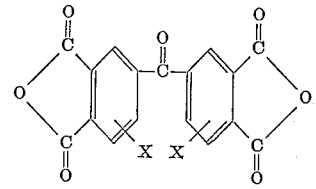

wherein X represents hydrogen, halogen, —NO$_2$, —COOH, —SO$_3$H or —NH$_2$ and may be the same or different radical.

Representative benzophenone tetracarboxylic dianhydrides include, among others, 3,3',4,4' - benzophenone tetracarboxylic dianhydride; 2 - bromo - 3,3',4,4' - benzophenone tetracarboxylic dianhydride; 2 - carboxy - 2'-sulfo - 3,3',4,4' - benzophenone tetracarboxylic dianhydride; 2 - amino - 2,3',4,4' - benzophenone tetracarboxylic dianhydride; and 5 -nitro - 3,3',3,4' - benzophenone tetracarboxylic dianhydride.

These dianhydrides may be prepared by oxidizing appropriate aryl compounds with nitric acid. In general, a nitric acid concentration of from about 5% to about 70% is employed and the amount may range from about 8.0 to about 17.0 on a molar ratio of 100% nitric acid relative to the aryl compound. The oxidation time can range from a few minutes to 2 or more days with from about 10 minutes to 2 hours generally employed. Temperatures of about 110° C. to about 350° C., with 150° C. to 250° C. being preferred, are employed. Since the oxidation reaction is preferably conducted in the liquid phase, pressures from about atmospheric to 500 pounds per square inch or higher are utilized. Upon completion of the oxidation reaction, the reaction mixture is allowed to cool, preferably down to about room temperature whereupon the reaction product precipitates out after from about 2 to 24 hours. These crystals of product are then separated from the liquid by any suitable means such as by filtration. The dried crystals are the dianhydrides utilized in the present compositions.

The aryl compounds which may be employed to produce the benzophenone tetracarboxylic dianhydrides of the present invention may be represented by the general structural formula:

wherein Ar represents the same or different aryl radicals containing one or more rings and wherein at least one is an aromatic ring attached directly to the carbon atom in said formula, such as phenyl, biphenyl, naphthyl, phenanthryl, anthryl, indyl, dihydronaphthyl and cyclohexylphenyl, said radicals carrying as nuclear substituents at least two radicals defined by R$_1$, said latter radicals being located at least two positions away from said carbon in the formula; and R$_1$ is selected from the group consisting of primary, secondary and tertiary alkyls having from one to 16 carbon atoms, such as methyl, ethyl, n-propyl, isopropyl, isobutyl, amyl, isoamyl, hexyl, isooctyl, decyl, tetradecyl, hexadecyl, and the like. The remaining positions on the aromatic rings can include radicals such as said diverse radicals defined hereinabove as well as alkyl groups having from one to 10 carbon atoms. It is critical in order to obtain the anhydrides useful in the present compositions that the nuclear substituents on the aromatic rings, defined above by $R_1$, be located at least two positions away from the carbon in the structural formula immediately above, otherwise the compounds produced will not be anhydrides but could be lactones.

Suitable aryl compounds which may be oxidized to produce dianhydrides useful in the present compositions include, among others, 1,1-bis(3,4,3',4'-tetramethylphenyl)ethane,
1,1-bis(2,2'-dibromo-3,4,3',4'-tetramethylphenyl)ethane,
1-(3-methyl-4-ethylphenyl) 1-(2'-nitro-3',4'-diethylphenyl)ethane,
1,1-bis(3,4,3',4'-tetramethyl-5-aminophenyl)ethane,
1,1-bis(3-ethyl-4-butylphenyl)isobutane,
1-(3,4-diethylphenyl) 1-(3',4'-disopropylphenyl)ethane,
1,1-bis(3,4,3',4'-tetramethylphenanthryl)ethane,
1-(3-methyl-4-isopropylnaphthyl) 1-(3',4'-diethylanthryl)ethane, etc.

The preferred aryl compound is di-ortho-xylylethane, which when oxidized with nitric acid at about 200° C. yields 3,3',4,4'-benzophenone tetracarboxylic dianhydride.

The polyepoxide materials used in preparing the compositions of the present invention comprise those organic materials which have more than one vic-epoxy group, i.e., more than one

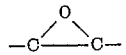

group, which group may be in a terminal position, i.e., a

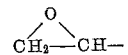

group, or in an internal position, i.e., a

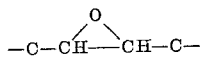

The polyepoxides may be saturated or unsaturated, aliphatic, cycloaliphatic, aromatic or heterocyclic and may be substituted with substituents, such as chlorine, hydroxyl groups, ether radicals, and the like.

Examples of such polyepoxides include, among others, 1,4-bis(2,3-epoxypropoxy)benzene,
1,3-bis(2,3-epoxypropoxy)benzene,
4,4'-bis(2,3-epoxypropoxy)diphenyl ether,
1,8-bis(2,3-epoxypropoxy)octane,
1,4-bis(2,3-epoxypropoxy)cyclohexane,
4,4'-bis(2-hydroxy-3,4'-epoxybutoxy)diphenyl dimethylmethane,
1,3-bis(4,5-epoxypentoxy)-5-chlorobenzene,
1,4-bis(3,4-epoxybutoxy)-2-chlorocyclohexane,
1,3-bis(2-hydroxy-3,4-epoxybutoxy)benzene,
1,4-bis(2-hydroxy-4,5-epoxypentoxy)benzene.

Other examples include the epoxy polyethers of polyhydric phenol with a halogen-containing epoxide or dihalohydrin in the presence of an alkaline medium. Polyhydric phenols that can be used for this purpose include, among others, resorcinol, catechol, hydroquinone, methyl resorcinol, or polynuclear phenols, such as 2,2-bis(4-hydroxyphenyl)propane (Bisphenol A), 2,2-bis(4-hydroxyphenol)butane, 4,4' - dihydroxybenzophenone, bis(4-hydroxyphenyl)ethane, 2,2 - bis(4-hydroxyphenyl)pentane and 1,5-dihydroxynaphthalene. The halogen-containing epoxides may be further exemplified by 3-chloro-1,2-epoxybutane, 3 - bromo-1,2-epoxyhexane, 3-chloro-1,2-epoxyoctane, and the like. By varying the ratios of the phenol and epichlorohydrin one obtains different molecular weight products as shown in U.S. 2,633,458.

A preferred group of the above-described epoxy polyethers of polyhydric phenols are glycidyl polyethers of the dihydric phenols. These may be prepared by reacting the required proportions of the dihydric phenol and epichlorohydrin in an alkaline medium. The desired alkalinity is obtained by adding basic substances such as sodium or potassium hydroxide, preferably in stoichiometric excess to the epichlorohydrin. The reaction is preferably accomplished at temperatures within the range of 50° C. to 150° C. The heating is continued for several hours to effect the reaction and the product is then washed free of salt and base.

The preparation of four suitable glycidyl polyethers of dihydric phenols is illustrated in U.S. 2,633,458 and are designated polyethers A, B, C and D.

Another group of polyepoxides comprises the polyepoxypolyethers obtained by reacting, preferably in the presence of an acid-acting compound, such as hydrofluoric acid, or of the afore-described halogen-containing epoxides, such as epichlorohydrin, with a polyhydric alcohol, and subsequently treating the resulting product with an alkaline component. As used herein and in the claims, the expressions "polyhydric alcohol" is meant to include those compounds having at least two free alcoholic OH groups and includes the polyhydric alcohols and their ethers and esters, hydroxy-aldehydes, hydroxy-ketones, halogenated polyhydric alcohols and the like. Polyhydric alcohols that may be used for this purpose may be exemplified by glycerol, propylene glycol, ethylene glycol, diethylene glycol, butylene glycol, hexanetriol, sorbitol, mannitol, pentaerythritol, polyallyl alcohol, polyvinyl alcohol, inositol, trimethylolpropane, bis(4 - hydroxycyclohexyl)dimethylmethane and the like.

The preparation of suitable such polyepoxide polyethers is illustrated in U.S. 2,633,458 as polyether F.

Particularly preferred members of this group comprise the glycidyl polyethers of aliphatic polyhydric alcohols containing from 2 to 10 carbon atoms and having from 2 to 6 hydroxyl groups and more preferably the alkane polyols containing from 2 to 8 carbon atoms and having from 2 to 6 hydroxyl groups. Such products, preferably have an epoxy equivalency greater than 1.0, and still more preferably between 1.1 and 4 and a molecular weight between 300 and 1000.

Another group of polyepoxides include the epoxy esters of polybasic acids, such as diglycidyl phthalate and diglycidyl adipate, diglycidyl tetrahydrophthalate, diglycidyl maleate, epoxidized dimethylallyl phthalate and epoxidized dicrotyl phthalate.

Examples of polyepoxides having internal epoxy groups include, among others, the epoxidized esters of polyethylenically unsaturated monocarboxylic acids, such as epoxidized linseed, soyabean, perilla, oiticica, tung, walnut and dehydrated castor oil, methyl linoleate, butyl linolinate, ethyl 9,12-octadecadienoate, butyl 9,12,15-octadecatrienoate, ethyl eleostearate, octyl 9,12-octadecadienoate, methyl eleostearate, monoglycerides of tung oil fatty acids, monoglycerides of soyabean oil, sunflower, rapeseed, hempseed, sardine, cottonseed oil, and the like.

Another group of the epoxy-containing materials having internal epoxy groups include the epoxidized esters of unsaturated alcohols having the ethylenic group in an internal position and polycarboxylic acids, such as, for example, di(2,3 - epoxybutyl)adipate, di(2,3 - epoxybutyl) oxalate, di(2,3-epoxyhexyl)succinate, di(2,3-epoxyoctyl) tetrahydrophthalate, di(4,5-epoxydodecyl)maleate, di(2,3-epoxybutyl)terephthalate, di(2,3 - epoxypentyl)thiodipropionate, di(2,3-epoxybutyl)citrate and di(4,5-epoxyoctadecyl)malonate, as well as the esters of epoxycyclohexanol and epoxycyclohexylalkanols, such as, for example, di(2,3-epoxycyclohexylmethyl)adipate and di(2,3-epoxycyclohexylmethyl)phthalate.

Another group of materials having internal epoxy groups include epoxidized esters of unsaturated alcohols and unsaturated carboxylic acids, such as 2,3-epoxybutyl 3,4-epoxypentanoate, 3,4-epoxyhexyl 3,4 - epoxypentanoate, 3,4-epoxycyclohexyl 3,4-cyclohexanoate, 2,3-epoxycyclohexylmethyl 2,3-epoxycyclohexanoate, and 3,4-epoxycyclohexyl 4,5-epoxyoctanoate, and the like.

Another group of materials having internal epoxy groups include epoxidized esters of unsaturated monocarboxylic acids and polyhydric alcohols, such as ethylene glycol di(2,3-epoxycyclohexanoate), glycerol tri(2,3-epoxycyclohexanoate) and pentanediol di(2,3-epoxyoctanoate).

Still another group of the epoxy compounds having internal epoxy groups include epoxidized derivatives of polyethylenically unsaturated polycarboxylic acids, such as, for example, dimethyl 8,9,11,13-diepoxyeicosanedioate, dibutyl 7,8,11,12-diepoxyoctadecanedioate, dioctyl 10,11-diethyl-8,9,12,13 - diepoxyeicosanedioate, dicyclohexyl 3,4,5,6-diepoxycyclohexane-dicarboxylate, dibenzyl 1,2,4,5-diepoxycyclohexane-1,2-dicarboxylate and diethyl 5,6,10,11-diepoxyoctadecyl succinate.

Still another group comprises the epoxidized polyesters obtained by reacting an unsaturated polyhydric alcohol and/or unsaturated polycarboxylic acid or anhydride groups, such as, for example, the polyester obtained by reacting 8,9,12,13-eicosadienedioic acid with ethylene glycol, the polyester obtained by reacting diethylene glycol with 2-cyclohexane-1,4-dicarboxylic acid and the like, and mixtures thereof.

Another group comprises the epoxidized polymers and copolymers of diolefins, such as butadiene. Examples of this include, among others, butadiene-acrylonitrile copolymers (Hycar rubbers), butadiene styrene copolymers and the like.

Still another group includes the epoxidized hydrocarbons, such as epoxidized 2,3-bis(cyclohexenyl)propane, 2,2-bis(cyclohexenyl)butane, 8,10-octadecadiene and the like.

Polyepoxides having an epoxy equivalent weight of between 400 and 4,000 are preferred. Polyepoxides having an average molecular weight above 500, as for example, between about 800 and 1500 and between about 2700 and 3100 are especially preferred. Very suitable polyepoxides are those formed from an epihalohydrin, and particularly epichlorohydrin, and a polyhydric compound, such as 2,2-bis(4-hydroxyphenyl)propane or glycerol.

The polyepoxide which is used in the composition of the present invention may be entirely a solid grade of resin as are the polyethers D and E, noted above, or may be a blend of resins in which one of them is a liquid grade, such as, a polyepoxide having an epoxy equivalent weight of between 225 and 290 and an average molecular weight of between 450 and 500 as represented by polyether A. Thus, a suitable mixture of polyepoxides is a mixture containing between 60% by weight of a solid polyepoxide derived from an epihalohydrin and 2,2-bis(4-hydroxyphenyl)propane having an epoxy equivalent weight of between 1,650 and 2,050 and an average molecular weight of between 2,700 and 3,100 (see, for example, U.S. 2,633,458, column 6, line 74 to column 7, line 9) and between 40% and 20% by weight of a liquid polyepoxide derived from an epihalohydrin and diphenylol propane having an epoxy equivalent weight of between 175 and 210, and an average molecular weight of between 350 and 400 (polyether A).

The polyepoxide may also be a blend of solid resins, and preferably a blend of a resin having a melting point higher than 100° C., and preferably, a resin having a melting point in the range of 120–160° C., and a resin having a melting point below 80° C., and preferably a resin having a melting point in the range of 60—80° C., the melting point being determined according to Durrans' Mercury Method. Thus, another suitable mixture of polyepoxides is a mixture containing between 30 and 50% by weight of a solid polyepoxide derived from an epihalohydrin and diphenylol propane and having an epoxy equivalent weight of between 1,650 and 2,050, and a melting point of between 120 and 160° C. and between 50 and 70% by weight of a solid polyepoxide derived from an epihalohydrin and diphenylol propane having an epoxy equivalent weight of between 450 and 525, and a melting point of between 60 and 80° C. (polyether D).

Stannous salts which are especially suitable for catalyzing the present compositions are the stannous salts of monocarboxylic acids having at least 5 carbon atoms, preferably fatty acids containing from about 5 to about 20 carbon atoms and more preferably from about 6 to 12 carbon atoms. Suitable stannous salts include, among others, stannous caproate, stannous octoate, stannous laurate, stannous palmitate, stannous stearate, stannous oleate, and stannous naphthenate. Stannous octoate is particularly preferred because it promotes exceptionally rapid cures and imparts outstanding flexibility as well as high impact strength and solvent resistance to the cured films and molding compositions. The stannous salt catalyst is beneficially employed in concentrations from about 0.1 to 5 parts per one hundred parts of polyepoxide and preferably from about 0.5 to 5 parts per one hundred parts of polyepoxide.

Suitable fillers which may be employed as desired, include, among many others, aluminum powder, mica, bentonites, clays, synthetic resins and elastomers, ignited $Al_2O_3$, short-fiber asbestos, wood fluors, carbon black, silica, zinc dust, talc and the like. A large number of fillers are available commercially in particle sizes from about 0.1 micron upward.

The quantity of fillers used is dependent upon many factors such as, cost, particle size, particle shape, absorption characteristics and loading volume. The lightweight fillers such as asbestos and uncompressed mica are employed in ratios below 50 phr. (parts per one hundred parts of polyepoxide) and generally below 35 phr.; the medium weight fillers, such as talc and powdered aluminum, may be employed up to about 100 phr.; and the heavier fillers may be employed up to about 150 phr. In general, however, in order to optimize raw material costs without minimizing coating properties, the ratio of filler to polyepoxide ranged from about 10 to about 60 phr.

It is generally desirable, although not necessary, to employ a thixotroping agent to prevent dripping or sagging at high film build. Any of the thixotroping agents normally used in the art are suitable for use in the present compositions, including silica aerogels, bentonite clays and their derivatives, castor oil derivatives and the like.

The proportions of the polyepoxide, benzophenone dianhydride curing agent, fillers, catalysts, thixotroping agents and other additives will vary within wide ranges; however, rapid cure and excellent film flexibility is achieved when the final composition comprises from about 50 to 80 parts by weight of polyepoxide and from about 5 to 20 parts by weight of benzophenone tetracarboxylic dianhydride; from about 0.1 to 5 parts of a stannous salt of a monocarboxylic acid; and, optionally, from about 5 to 30 parts by weight of filler.

A particularly good composition possessing outstanding flexibility and solvent resistance when cured in 1 minute or less at a temperature range of 400–450° F. comprises from about 65 to 75 parts by weight of a glycidyl polyether of 2,2-bis(4-hydroxyphenyl)propane having a molecular weight of from about 900 to about 1500, an epoxide value of about 0.10 to about 0.20 eq./100 g., and a hydroxyl value of about 0.32 to 0.35 eq./100 g. from about 8 to 15 parts by weight of 3,3′,4,4′-benzophenone tetracarboxylic dianhydride, and from about 0.5 to 2.0 parts by weight of stannous octoate. No appreciable degradation in coating properties are observed when from about 5 to 30 parts by weight of a filler is added to this composition.

Another particularly good composition having excellent flexibility and rapid curing properties with only slight sacrifice in solvent resistance is obtained when the polyepoxide in the above composition is a glycidyl polyether of 2,2-bis(4-hydroxyphenyl)propane having an epoxy value of about 0.05 eq./100 g., a molecular weight of about 2900 and a melting point of from about 127–133° C. by Durrans' Mercury Method.

The coating compositions of the present invention can be prepared as powders or in solution. When powders are desired, they can be prepared by both dry blending and fusion blending techniques.

Mixtures of cresylic acid with high boiling aromatic hydrocarbons have been found suitable for preparing these coatings from solution.

In general, the average particle size of the powders may range from rather small particle sizes of, say, 5 microns or even smaller, to 600 microns or greater. An especially preferred range is between 50 and 300 microns. A very suitable fluidizable composition was prepared by micropulverizing the blended components to pass through 100 mesh size screen (147 microns).

Any of the conventional fluidized bed coating techniques may be employed wherein the fluidized bed comprises the instant compositions maintained in a dense turbulent condition by means of a gaseous stream continuously introduced into the fluidized bed. In general, in carrying out a fluidized bed coating process, the article is preferably heated to a temperature of at least 100° C., and preferably between about 120° and 250° C., before it is dipped into the fluidized bed. If an article is to be completely coated it should of course be completely immersed in the fluidized bed. The article is preferably moved backwards and forwards in the bed, over a period of time determined by the desired thickness of coating. For the production of thin coatings, i.e., less than 0.015 inch thick, the period during which an article is dipped or immersed into the bed is usually less than 3 seconds.

After the article has been in contact with the fluidized bed for the desired time, it is removed, excess powder adhering to the article is preferably removed, and the coating cured by heating to at least 125° C., preferably between 150 and 250° C.

The compositions of the instant invention may also be sprayed as by a compressed air spray gun or electrostatically, i.e., by maintaining a difference in electrostatic change between the particles and the article to be coated.

The invention is illustrated by the following examples. The reactants, their proportions and other specific ingredients of the formulations are presented as being typical and various modifications can be made in view of the foregoing disclosure without departing from the spirit or scope of the disclosure or of the claims. Unless otherwise specified, parts and percentages disclosed are by weight.

EXAMPLE I

This example illustrates the preparation of the fluidizable polyepoxide compositions as well as their superiority over a conventional fast-cure epoxy powdered system.

A rapid curing flexible composition was prepared by dry blending the following components:

|  | Percent, weight |
|---|---|
| Polyepoxide (a glycidyl polyether of 2,2-bis(4-hydroxyphenyl)propane having a melting point of 98° C., a molecular weight of 1400 and an epoxide value of 0.103 eq./100 g.) | 68.48 |
| 3,3′,4,4′ - benzophenone tetracarboxylic dianhydride | 11.52 |
| Filler (Silica 219, fine silica sand) | 19.00 |
| Thixotroping agent (Santocel 54, a silica aerogel containing 94% SiO$_2$) | 1.00 |
| Stannous octoate | 1 phr.[a] |

[a] Parts per 100 parts of polyepoxide.

Any one of the following three dry blending procedures may be employed:

(1) All the dry ingredients are loaded into a jar mill with about a 10% media charge and pulverized to 100 mesh or finer. The liquid stannous octoate is then added to the mill and the charge re-run for an additional 15–20 minutes to insure a uniform coating of the catalyst on the particle surface of the blended dry ingredients.

(2) All the dry ingredients which have previously been ground to 100 mesh or finer are loaded into a Rota-Cone blender equipped with agitator and liquid spraying device. The liquid stannous octoate catalyst is metered in by pump pressure while the unit is operating.

(3) Similar to above but using a ribbon mixer with mullers and spraying the catalyst through the cover of the unit.

This composition was then evaluated for impact resistance, solvent resistance and flexibility at fast curing time.

A fluidized bed was prepared and a coating having film thickness of 10 mils was applied to ¾″ diameter, 6″ long sandblasted round steel probes. The coating was then cured for 30 seconds at 450° F.

The impact was determined on the film by direct impact measured in inch-pounds required to shatter the coating.

The solvent resistance was determined by immersing the coated article in methyl ethyl ketone (MEK). The time was then recorded when the surface coating could be scratched with the fingernail.

To evaluate the flexibility, a No. 10 copper wire was coated with the above-identified composition to a film thickness of 10 mils. The cured wire coating was then clamped firmly on a 1 inch-round mandrel. The free end was then bent around the mandrel until the first crack appeared on the wire coating. The angle at which such cracking occurred was measured in degrees.

The procedure was essentially repeated wherein the novel polyepoxide composition of the present invention was replaced with a commercially available proprietary rapid curing hydrazide-epoxy system.

The comparative results are tabulated below.

| Composition | Impact Resistance, in.-lbs. | Solvent Resistance (MEK), minutes | Flexibility (degrees) | Distilled Water Resistance (200° F.) | Vicat Softening Point, °C. |
|---|---|---|---|---|---|
| Polyepoxide-3,3′,4,4′-benzophenone tetracarboxylic dianhydride composition. | 30–40 | 20 | >90 | Unaffected after 100 hrs. immersion. | >150 |
| A proprietary hydrazide-epoxide composition. | 10–15 | 0.5 | 10 | Saturated with many small blisters after 100 hrs. immersion. | 100 |

Both compositions were equally unaffected after 3 months immersion in mineral spirits, xylene, carbon tetrachloride, 10% HNO$_3$, 37% HCl, 50% H$_2$SO$_4$, 25% acetic acid, saturated NaOH, and 29% NH$_4$OH. Both compositions exhibited excellent resistance to salt spray and humidity after 1000 hours of exposure.

EXAMPLE II

Substantially the same procedure was repeated as in Example I except the polyepoxide employed was a glycidyl polyether of 2,2-bis(4-hydroxyphenyl)propane having a molecular weight of 2900, a softening point of 131° C., and an epoxy value of 0.05 eq./100 grams. Similar superior impact resistance and flexibility was observed. The solvent resistance while not as good as the polyepoxide coating composition of Example I, was still better than the hydrazide-epoxide system.

EXAMPLE III

This example illustrates the preparation of the fluidizable polyepoxide composition of Example I by a fusion blending procedure.

The polyepoxy resin is charged into a steam jacketed Baker Perkins dispersion mill and heated to 110°–120° C. The inert pigments and extenders are then added and thoroughly dispersed for about 30 minutes. The stannous octoate is now mixed in for about 5–10 minutes followed by the addition of the dianhydride. Ten minutes after this last addition, the taffy like mixture is discharged from the mill, cooled and micropulverized.

This composition was evaluated in the same manner as the dry blended composition of Example I and similar results were obtained.

EXAMPLE IV

A solvent coating composition was easily prepared by placing the following ingredients on a drawer shaker until complete solution was affected:

|  | Percent, weight |
|---|---|
| Polyepoxide (a glycidyl polyether of 2,2-bis(4-hydroxyphenyl)propane having a melting point of 98° C., a molecular weight of 1400 and an epoxide value of 0.103 eq./100 g.) | 42.50 |
| 3,3',4,4' - benzophenone tetracarboxylic dianhydride | 7.07 |
| Cresylic acid (mixture of o-, m-, and p-cresols) | 25.00 |
| Shell Cyclo-Sol 68W | 25.00 |
| Stannous octoate | 0.43 |
|  | 100.00 |

Films (0.5 mil) of the above composition were applied to various steel substrates and 22 gage aluminum. A bake of one minute at 550° F. was employed.

No "flash off" time was allowed.

All films showed good gloss with no bubbling or blistering. Scotch-tape, "cross hatch" tests were performed and indicated excellent adhesion on all substrates. The films also exhibited very good impact, flexibility and solvent resistance properties.

EXAMPLE V

This example illustrates the superiority of stannous octoate over other metallic octoates in the preparation of fluidizable polyepoxide compositions.

The procedure of Example I was essentially repeated wherein the stannous octoate was replaced with an equal amount of other metal octoates.

The results are tabulated below.

| Metal Salt | Phr.[a] | Impact Resistance, in.-lbs. | Solvent Resistance MEK, min. | Flexibility (degrees) |
|---|---|---|---|---|
| Stannous octoate | 1 | 25 | >30 | >90 |
|  | 3 | 25 | >30 | >90 |
| Lead octoate | 1 | 10–15 | 5 | 65 |
|  | 3 | <10 | 10 | 50 |
| Aluminum octoate | 1 | <10 | <5 | >90 |
|  | 3 | <10 | <5 | 40 |
| Zinc octoate | 1 | <10 | 10 | 75 |
|  | 3 | 10–15 | 15–20 | 50 |
| Cobalt octoate | 1 | <10 | <5 | 70 |
|  | 3 | <10 | <5 | 60 |
| Calcium octoate | 1 | <10 | <5 | 55 |
|  | 3 | <10 | <5 | 50 |
| Zirconium octoate | 1 | 10–15 | <5 | 90 |
|  | 3 | 40 | <5 | 60 |
| Ferrous octoate | 1 | <10 | <5 | >90 |
|  | 3 | <10 | <5 | >90 |
| Manganese octoate | 1 | <10 | <5 | 30 |
|  | 3 | <10 | <5 | 20 |
| Nickel octoate | 1 | <10 | <5 | >90 |
|  | 3 | <10 | 5–10 | 20 |
| Chromium octoate | 1 | <10 | 10–15 | 20 |
|  | 3 | <10 | <5 | 60 |
| Cerium octoate | 1 | <10 | <5 | 40 |
|  | 3 | <10 | <5 | 80 |
| Cuprous octoate | 1 | <10 | <5 | 50 |

[a] Parts per one hundred parts of polyepoxide.

EXAMPLE VI

This example illustrates the effectiveness of representative stannous salts.

The procedure of Example I was substantially repeated wherein the stannous octoate was replaced with an equal amount of other stannous salts. The results of tests made on the cured polyepoxide resin composition are tabulated below.

| Stannous Salt | Phr.[a] | Impact Resistance, in.-lbs. | Solvent Resistance MEK, min. | Flexibility (degrees) |
|---|---|---|---|---|
| Stannous caproate | 1 | 20–25 | 10 | >90 |
|  | 3 | 20–25 | 20 | 40 |
| Stannous laurate | 1 | 10–15 | 15 | 90 |
|  | 3 | 10–15 | >30 | 45 |
| Stannous oleate | 1 | 20–25 | >30 | 90 |
|  | 3 | 20–25 | >30 | 40 |
| Stannous naphthenate | 1 | 15–20 | >30 | 90 |
|  | 3 | 20–25 | >30 | 30 |

[a] Parts per one hundred parts of polyepoxide.

The compositions of the present invention are equally suitable for use as molding compositions. In general, the relative proportions and constituents are the same as the fluidizable compositions; however, liquid polyepoxide resins, i.e., liquid at temperatures up to about 50° C., are preferred over the solid resins. It was found that such molding systems react very slowly at ambient temperatures so that they remain liquid through most of their useful life. When required fillers and mold release agents are incorporated therein, a putty-like composition is obtained which can then be stored until molded. Such a formulation has a shelf life in excess of one month yet can be cured to a rigid state in one minute at 350° F. Typical molded specimens exhibited a heat deflection temperature of 400° F. after two minutes cure. These molding compositions are particularly suitable for use as high temperature resistant compositions.

Any mold release agents generally employed in the casting, molding, potting and encapsulating of polyepoxide resins are suitable, such as, for example, aluminum stearate, zinc stearate and low molecular weight silicone polymers.

We claim as our invention:

1. A fluidizable, heat-curable polyepoxide coating composition possessing fast-cure properties consisting essentially of a blended powder having an average particle size between 5 and 600 microns, said blended powder comprising from 50 to 80 parts by weight of a solid pulverizable epoxy resin having from 5 to 20 parts by weight of a vic-epoxy equivalency greater than 1.0, from 0.1 to 5 parts by weight per one hundred parts of the epoxy resin of a benzophenone tetracarboxylic dianhydride and a stannous salt of a monocarboxylic acid.

2. A fluidizable polyepoxide coating composition as in claim 1 wherein the polyepoxide is a glycidyl polyether of a polyhydric phenol.

3. A fluidizable polyepoxide coating composition as in claim 1 which additionally comprises from 5 to 30 parts by weight of a filler.

4. A fluidizable polyepoxide coating composition as in claim 1 wherein the stannous salt is a salt of a fatty acid containing from 5 to 20 carbon atoms in the molecule.

5. A fluidizable, heat-curable polyepoxide coating composition possessing fast-cure properties consisting essentially of a blended powder having an average particle size between 50 and 300 microns, said blended powder comprising from 50 to 80 parts by weight of a glycidyl polyether of 2,2-bis(4-hydroxyphenyl)propane, from 5 to 20 parts by weight of a benzophenone tetracarboxylic dianhydride and from 0.1 to 5 parts of stannous octoate per one hundred parts of the glycidyl polyether.

6. A fluidizable, heat-curable polyepoxide coating composition possessing fast-cure properties consisting essentially of a blended powder having an average particle size between 50 and 300 microns, said blended powder comprising from 65 to 75 parts by weight of a glycidyl polyether of 2,2-bis(4-hydroxyphenyl)propane having a molecular weight of from 900 to 1500 and an epoxide value of from 0.10 to 0.20 eq./100 g., from 8 to 15 parts by weight of 3,3′,4,4′-benzophenone tetracarboxylic dianhydride and from 0.5 to 2.0 parts by weight of stannous octoate.

7. A composition as in claim 6 wherein the glycidyl polyether of 2,2-bis(4-hydroxyphenyl)propane has a molecular weight of 2700 to 3100 and an epoxide value of about 0.05 eq./100 g.

References Cited

UNITED STATES PATENTS

| | | | |
|---|---|---|---|
| 3,039,987 | 6/1962 | Elbling | 260—37 |
| 3,078,279 | 2/1963 | McCracken et al. | 260—2 X |
| 3,102,043 | 8/1963 | Winthrop et al. | 117—21 |
| 3,201,360 | 8/1965 | Proops et al. | 260—18 |
| 3,269,974 | 8/1966 | Childs | 260—830 X |

FOREIGN PATENTS

| | | |
|---|---|---|
| 903,933 | 8/1962 | Great Britain. |

DONALD E. CZAJA, *Primary Examiner.*

LEON J. BERCOVITZ, *Examiner.*

C. W. IVY, *Assistant Examiner.*

UNITED STATES PATENT OFFICE
CERTIFICATE OF CORRECTION

Patent No. 3,344,096            September 26, 1967

Joseph P. Manasia et al.

It is hereby certified that error appears in the above numbered patent requiring correction and that the said Letters Patent should read as corrected below.

Column 10, line 55, beginning with "from 5 to 20" strike out all to and including "dianhydride and" in line 58, same column 10, and insert instead -- a vic—epoxy equivalency greater than 1.0, from 5 to 20 parts by weight of a benzophenone tetracarboxylic dianhydride and from 0.1 to 5 parts by weight per one hundred parts of the epoxy resin of --.

Signed and sealed this 22nd day of October 1968.

(SEAL)
Attest:

Edward M. Fletcher, Jr.            EDWARD J. BRENNER

Attesting Officer            Commissioner of Patents